(12) United States Patent
Beyer et al.

(10) Patent No.: US 8,117,535 B2
(45) Date of Patent: *Feb. 14, 2012

(54) SYSTEM AND METHOD FOR CREATING DYNAMIC FOLDER HIERARCHIES

(75) Inventors: Kevin Scott Beyer, San Jose, CA (US); Hui-I Hsiao, Saratoga, CA (US); Joshua Wai-Ho Hui, San Jose, CA (US); Ning Li, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 891 days.

This patent is subject to a terminal disclaimer.

(21) Appl. No.: 12/044,546

(22) Filed: Mar. 7, 2008

(65) Prior Publication Data

US 2008/0154866 A1 Jun. 26, 2008

(51) Int. Cl.
*G06F 17/00* (2006.01)

(52) U.S. Cl. .................................................... 715/234

(58) Field of Classification Search .................. 715/200, 715/234
See application file for complete search history.

(56) References Cited

U.S. PATENT DOCUMENTS

| | | | |
|---|---|---|---|
| 5,361,349 A | 11/1994 | Sugita et al. | |
| 5,418,946 A | 5/1995 | Mori | |
| 5,812,995 A | 9/1998 | Sasaki et al. | |
| 5,832,470 A | 11/1998 | Morita et al. | |
| 5,890,147 A * | 3/1999 | Peltonen et al. | 1/1 |
| 6,026,388 A * | 2/2000 | Liddy et al. | 1/1 |
| 6,101,512 A | 8/2000 | DeRose et al. | |
| 6,189,012 B1 * | 2/2001 | Mital et al. | 717/165 |
| 6,266,682 B1 | 7/2001 | LaMarca et al. | |
| 6,356,915 B1 | 3/2002 | Chtchetkine et al. | |
| 6,363,400 B1 | 3/2002 | Chtchetkine et al. | |
| 6,377,983 B1 | 4/2002 | Cohen et al. | |
| 6,631,496 B1 * | 10/2003 | Li et al. | 715/200 |
| 6,681,221 B1 | 1/2004 | Jacobs | |
| 6,691,282 B1 * | 2/2004 | Rochford et al. | 715/234 |
| 6,701,308 B1 | 3/2004 | Chen et al. | |
| 6,832,350 B1 * | 12/2004 | Bates et al. | 715/206 |
| 6,950,822 B1 | 9/2005 | Idicula et al. | |
| 7,346,608 B2 * | 3/2008 | Annau et al. | 1/1 |
| 7,359,897 B2 * | 4/2008 | Singh et al. | 707/770 |

(Continued)

OTHER PUBLICATIONS

Hui et al., Hubble: An Advanced Dynamic Folder Technology for XML, ACM 2005, pp. 541-552.*

(Continued)

*Primary Examiner* — Cong-Lac Huynh

(74) *Attorney, Agent, or Firm* — Jon A. Gibbons; Fleit Gibbons Gutman Bongini & Bianco PL

(57) ABSTRACT

A dynamic foldering system automatically manages the creation and deletion of run-time dynamic folders and selection of documents, items, or object graphs found in the run-time dynamic folders. The system comprises a query/predicate for a design-time folder group based on which dynamic folders are automatically managed, a variable binding mechanism, automatic identifications of dynamic folders containing a particular object, parallel navigation, and customized combination of foldering results. The dynamic folder hierarchy is defined by a hierarchy of design-time folder groups defined by a query/predicate on a document comprising structured or semi-structured data. Modifiable criteria for creating the dynamic folder hierarchy are provided by the user. Variable binding provides powerful query/predicate definitions on hierarchical data or graph-structured data. Given a document, the system automatically identifies which dynamic folders contain the document.

19 Claims, 6 Drawing Sheets

U.S. PATENT DOCUMENTS

| | | | |
|---|---|---|---|
| 7,415,459 B2* | 8/2008 | Peltonen et al. | 1/1 |
| 7,484,213 B2* | 1/2009 | Mathew et al. | 718/100 |
| 7,523,386 B2* | 4/2009 | Awada et al. | 715/200 |
| 7,634,471 B2* | 12/2009 | Chen et al. | 1/1 |
| 7,822,705 B2* | 10/2010 | Xia | 707/603 |
| 7,933,889 B2* | 4/2011 | Smetters et al. | 707/708 |
| 2001/0039553 A1* | 11/2001 | LaMarca et al. | 707/501.1 |
| 2002/0097278 A1 | 7/2002 | Mandler et al. | |
| 2003/0041072 A1 | 2/2003 | Segal et al. | |
| 2003/0084404 A1 | 5/2003 | Dweck et al. | |
| 2003/0126165 A1 | 7/2003 | Segal et al. | |
| 2003/0135495 A1 | 7/2003 | Vagnozzi | |
| 2003/0142953 A1 | 7/2003 | Terada et al. | |
| 2003/0177190 A1 | 9/2003 | Moody et al. | |
| 2003/0191661 A1 | 10/2003 | Doyle et al. | |
| 2003/0217335 A1 | 11/2003 | Chung et al. | |
| 2003/0225925 A1* | 12/2003 | Kusterer et al. | 709/315 |
| 2004/0013302 A1 | 1/2004 | Ma et al. | |
| 2004/0015485 A1 | 1/2004 | Salerno et al. | |
| 2004/0128169 A1 | 7/2004 | Lusen | |
| 2004/0186750 A1* | 9/2004 | Surbey et al. | 705/4 |
| 2004/0205665 A1 | 10/2004 | Matsuishi | |
| 2005/0022115 A1 | 1/2005 | Baumgartner et al. | |
| 2005/0076095 A1 | 4/2005 | Mathew et al. | |
| 2005/0097092 A1* | 5/2005 | Annau et al. | 707/3 |
| 2005/0120300 A1 | 6/2005 | Schwager et al. | |
| 2005/0125378 A1 | 6/2005 | Kawada | |
| 2005/0198060 A1 | 9/2005 | Imaki et al. | |
| 2005/0273701 A1* | 12/2005 | Emerson et al. | 715/513 |
| 2005/0278614 A1 | 12/2005 | Aizikowitz et al. | |
| 2006/0020583 A1 | 1/2006 | Baranov et al. | |
| 2006/0064427 A1 | 3/2006 | Segal et al. | |
| 2006/0095375 A1 | 5/2006 | Doyle et al. | |
| 2006/0112078 A1 | 5/2006 | Betarbet et al. | |
| 2006/0218509 A1 | 9/2006 | Stauder et al. | |
| 2007/0061416 A1 | 3/2007 | Gould | |
| 2007/0118793 A1 | 5/2007 | Arora et al. | |
| 2007/0143667 A1* | 6/2007 | Deaton et al. | 715/513 |
| 2009/0313278 A1* | 12/2009 | DeWoolfson | 707/102 |
| 2011/0016106 A1* | 1/2011 | Xia | 707/706 |

OTHER PUBLICATIONS

Dourish et al., Extending Document Management Systems with User-Specific Active Properties, ACM 2000, pp. 140-170.*

Li et al, Hubble: An Advanced Dynamic Folder Technology for XML, ACM 2005, pp. 541-552.*

Hodel et al., Using text Editing Creation Time Meta Data for Document Management, Google 2005, pp. 105-118.*

"Hierarchical Directories on CMS Minidisks," IBM Technical Discosure Bulletin, vol. 33, No. 10A, Mar. 1991, p. 192-196.

"Virtual File Access to a Binary Relational Database," IBM Technical Disclosure Bulletin, Apr. 1983, p. 5911-5913.

G.C.H. Sharman, "Method for Presenting Database Query in List and Item Modes," IBM Technical Disclosure Bulletin, vol. 23, No. 4, Sep. 1983, p. 2167-2168.

J. Eder et al., "Self-maintained Folder Hierarchies as Document Repositories," Int'l Conference on Digital Libraries: Research and Practice, Kyoto, Japan, Nov. 2000.

D.K. Gifford et al., "Semantic File Systems," ACM Symposium of the 13$^{th}$ ACM Symposium on Operating Systems Principles, p. 16-25, 1991.

"G5 Technical Note: G5 Desktop," Green Pasture Software, Inc., 2001.

D.J. Pullin et al., "Method for Accessing Hierarchical View of a Binary Relational Database," IBM Technical Disclosure Bulletin, vol. 26, No. 5, Oct. 1983, p. 2557-2559.

Li et al., Hubble: An Advanced Dynamic Folder Technology for XML, the 31$^{st}$ VLDB Conference, Google 2005, pp. 541-552.

* cited by examiner

SYSTEM AND METHOD FOR CREATING DYNAMIC FOLDER HIERARCHIES

CROSS-REFERENCE TO RELATED APPLICATIONS

This application is based upon and claims priority from prior U.S patent application Ser. No. 10/710,288, now U.S. Pat. No. 7,370,273, filed on Jun. 30, 2004 the entire disclosure of which is herein incorporated by reference.

BACKGROUND OF INVENTION

The present invention generally relates to the field of organizing and inter-relating data files. More particularly, the present invention relates to a system and associated method for a dynamic folder hierarchy such that documents, items, or object groups stored without external organization provided by a static folder hierarchy can be viewed by the user in a dynamic folder hierarchy that adapts to modifications of the documents, items, or object groups without manual intervention.

As used herein, the term "folder" refers for example to a named collection of related items that can be retrieved, moved, and otherwise manipulated as one entity. "Foldering" or "linking" is a process where a content management system manages or controls the creation, retrieval, editing and distribution of content within an information processing system. Foldering or linking is the act of forming a "link" relationship between two Items. Generally, the content management system enables an end user to create a folder in the content management system and file it into a library by interacting with a suitable application.

Foldering is a generic concept of grouping documents or entities. A folder hierarchy can be used as a classification method to categorize documents, helping to narrow a search space for documents and providing a natural method of navigating documents. Examples of providing the folder hierarchy can be found in file systems such as, for example, the NTFS on Windows platforms, or in an email repository such as, for example, Lotus Notes®.

Conventional foldering mechanisms require a user to manually maintain the placement of documents in a folder within a folder hierarchy. When the content of a document is changed, users have to determine a location for the document within the folder hierarchy that matches the new content of the document. The possibility of misplacing documents in a folder hierarchy is relatively high. Once the document is misplaced, it can be difficult to locate.

Auto foldering systems address the issues of manual foldering. Conventional auto foldering systems automatically place the documents in folders using a predefined criterion based on the properties or content of the document. OLE_LINK2 Although this technology has proven to be useful, it would be desirable to present additional improvements. OLE_ LINK2 Using an auto foldering system allows association of a document with many folders. If changes in the content of such a document occur frequently, the processing overhead involved in reevaluating the foldering criteria and placing the document in appropriate folders is high.

Conventional dynamic foldering systems address the issues of manual foldering while reducing processing overhead of auto foldering systems. Instead of requiring static placement of a document in one or more specific folders, a criterion (or criteria) is defined for each design-time folder to describe which documents are associated with the folder. When during run-time a corresponding dynamic folder is accessed via query or path navigation, a collection of documents is evaluated against the defined criteria. Those documents in the collection of documents that satisfy the criteria of the dynamic folder appear as members of the folder.

One conventional dynamic folder system provides a mechanism to populate "smart" folders with documents retrieved from a search executed upon a "folder open" command [reference is made to "Smart Folders in Greenpasture", G5 Desktop Technical Note, http://www.greenpasture.com/teknotes/teknote_g5_desk top_03.pdf]. The smart folders contain pointers to documents returned from a saved search. To create a smart folder, a user first defines and saves a search. The user then creates a smart folder and associates the saved search with the smart folder. The system runs a search each time the user opens the smart folder and fills the folder with documents returned from the search. The result of the smart folder is the result of joining the nested queries of the nested folders [reference is made to http://www.greenpasture.com/demos.html]. One document can reside in any number of smart folders. The user may configure smart folders to search the entire library or base a search upon the position of the smart folder in the folder hierarchy. In the latter case, a smart folder returns only documents that are stored in folders at or below its own level in the hierarchy.

Another dynamic foldering system provides three ways of defining a folder using metadata: explicit folder creation, template-based folder creation, and rule-based folder creation [reference is made to J. Eder, et. al., "Self-maintained Folder Hierarchies as Document. Repositories". Int'l Conference on Digital Libraries: Research and Practice, Kyoto, Japan, November 2000]. In this dynamic foldering system, metadata is in the form of the attribute name-value pair. Examples of definition of explicit folder creation are:
create folder research under/with org=lab
create folder 2000 under /*/new with year=2000.
Examples of definition of template-based folder creation are:
create folder under/research by dept named D-$val
create folder under/research by dept/year.
Examples of rule-based folder creation are:
rule r1: create folder old under/* with year <1998
rule r2: create permanent folder public under/research/*/year:* with clearance <secret and year> 1999.

This dynamic foldering system allows distinct values of an attribute to be the classification criteria for assigning a document to a folder as in template-based folder creation. Consequently, the folder hierarchy of this dynamic foldering system is driven by the content of the documents.

Yet another conventional dynamic foldering system utilizes a query language to retrieve some of the information from XML documents [reference is made to U.S. Pat. No. 5,418,946]. This conventional dynamic foldering system uses the retrieved information to automatically organize a hierarchy in which to organize the XML documents.

Although these conventional dynamic foldering technologies have proven to be useful, it would be desirable to present additional improvements. The conventional folder definitions mostly address only the domain of the flat data model. Many of the conventional dynamic foldering technologies assume the metadata appears in the form of a name-value attribute pair. Conventional dynamic foldering technologies do not provide a complete solution to cover the hierarchical data model, such as XML, where the criteria of a folder may depend on the context of the criteria of the ancestor folders. Further, the foldering criteria associated with a conventional dynamic folder are static, requiring determination when the folder is created. There is no mechanism in conventional foldering technologies to tailor the foldering criteria at the time a user accesses the dynamic folder. For example, users may want to define a criterion of the folder to be based on the current month.

What is therefore needed is a system, a service, a computer program product, and an associated method for creating dynamic folder hierarchies utilizing a context of a criteria of ancestor folders and dynamic foldering criteria. Further, a dynamic foldering technique is desired that allows a user to define foldering criteria at the time a user accesses a dynamic folder. The need for such a solution has heretofore remained unsatisfied.

SUMMARY OF INVENTION

The present invention satisfies this need, and presents a system, a service, a computer program product, and an associated method (collectively referred to herein as "the system" or "the present system") for creating a dynamic folder hierarchy. The dynamic folder hierarchy is defined by a hierarchy of design-time folder groups. The design-time folder group is defined by a parameterized query/predicate on a document comprising structured or semi-structured data such as an XML document, an item, or an object graph.

The present system automatically manages the creations and deletions of the run-time dynamic folders. The present system further automatically manages selection of documents, items, or object graphs found in the run-time dynamic folders. An item refers to an object that has both metadata (can be of hierarchical structure such as XML) and one or more contents (structured, semi- or un-structured). An object graph refers to a graph structure of objects, where the objects can be XML documents, items, or other data. The existence of a folder within the present system depends on whether any documents in a collection of documents being organized by the present system meet the criteria for creation of that folder. If none of the documents in the collection of documents meet the criteria for a folder, the folder is not created.

The present system utilizes features of structured and semi-structured documents, items, or object graphs (collectively referenced as documents) to dynamically create the dynamic folders. The documents comprise a self-describing data format. The self-describing data format is analyzed by the present system to place the documents in a dynamic folder hierarchy. For example, an XML document comprises descriptive tags such as <author>. These descriptive tags are used by the present system to dynamically organize documents within a dynamic folder hierarchy. If designed to organized documents based on "author", the present system utilizes the <author> tag to create dynamic folders based on names of authors and conceptually places the document in the appropriate dynamic folders.

The documents are not physically placed in a dynamic folder by the present system. Rather, the present system retrieves a set of documents matching a query; the present system follows a path to retrieve documents much as a user follows a path in opening folders in a conventional foldering system to view documents co-located based on some criteria. The criteria for creating a dynamic folder hierarchy are predetermined by the user. The user can modify these criteria without changing the location of any of the documents that the dynamic folder hierarchy is organizing. Based on the criteria for the dynamic folder hierarchy, the dynamic folder hierarchy changes the location of documents within the dynamic folder hierarchy after document update without requiring manual intervention by a user.

The present system comprises a query/predicate for a design-time folder group based on which dynamic folders are automatically managed, a variable binding mechanism, automatic identifications of dynamic folders containing a particular object, parallel navigation, and customized combination of foldering results. The query/predicate for a design-time folder group can be a parameterized query, making the query/predicate more dynamic and useful than conventional dynamic foldering techniques.

The present system uses variable binding to provide powerful query/predicate definitions on hierarchical data or graph-structured data. The variable binding mechanism for query/predicate definition is very useful for hierarchical data and graph-structured data.

Given a document, the present system automatically identifies which dynamic folders contain the document. The automatic identification of the dynamic folders that contain a particular document is very useful for analyzing the semantics of the object.

The present system comprises parallel navigation, allowing a user to navigate along additional paths in a hierarchy and combine the navigation results using set operations. The parallel navigation and the customized combination of the results provide a very powerful navigation mechanism.

The present system may be embodied in a utility program such as a dynamic folder hierarchy utility program. The present system provides means for the user to identify a collection of data as input data for which a dynamic folder hierarchy may be created by the present system. The present system also provides means for the user to specify a design-time folder group definition including a set of variable binding expressions from which the dynamic folder hierarchy is created. The present system further provides means by which a user may select a document to view or criteria by which a document is found. A user specifies the input data, the design-time folder group definitions including a set of variable binding expressions, and then invokes the dynamic folder hierarchy utility program to create the dynamic folder hierarchy. The user then invokes the dynamic folder hierarchy utility program to view a document or set of documents by specifying the desired dynamic folder(s).

BRIEF DESCRIPTION OF DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION

The following definitions and explanations provide background information pertaining to the technical field of the present invention, and are intended to facilitate the understanding of the present invention without limiting its scope:

Document: One definition of document is data stored in a structured or semi-structured format including items, objects, and object graphs. Another definition of document is a computer file that contains data that contains at least some data in structured or semi-structured format.

XML: eXtensible Markup Language. A standard, semi-structured language used for Web documents. During a document authoring stage, XML "tags" are embedded within the informational content of the document.

Internet: A collection of interconnected public and private computer networks that are linked together with routers by a set of standard protocols to form a global, distributed network.

Item: an object that has both metadata (can be of hierarchical structure such as XML) and one or more contents (structured, semi- or un-structured).

Object: a graph structure of objects, where the objects can be documents, items, or other data.

World Wide Web (WWW, also Web): An Internet client server hypertext distributed information retrieval system.

Figure 1:
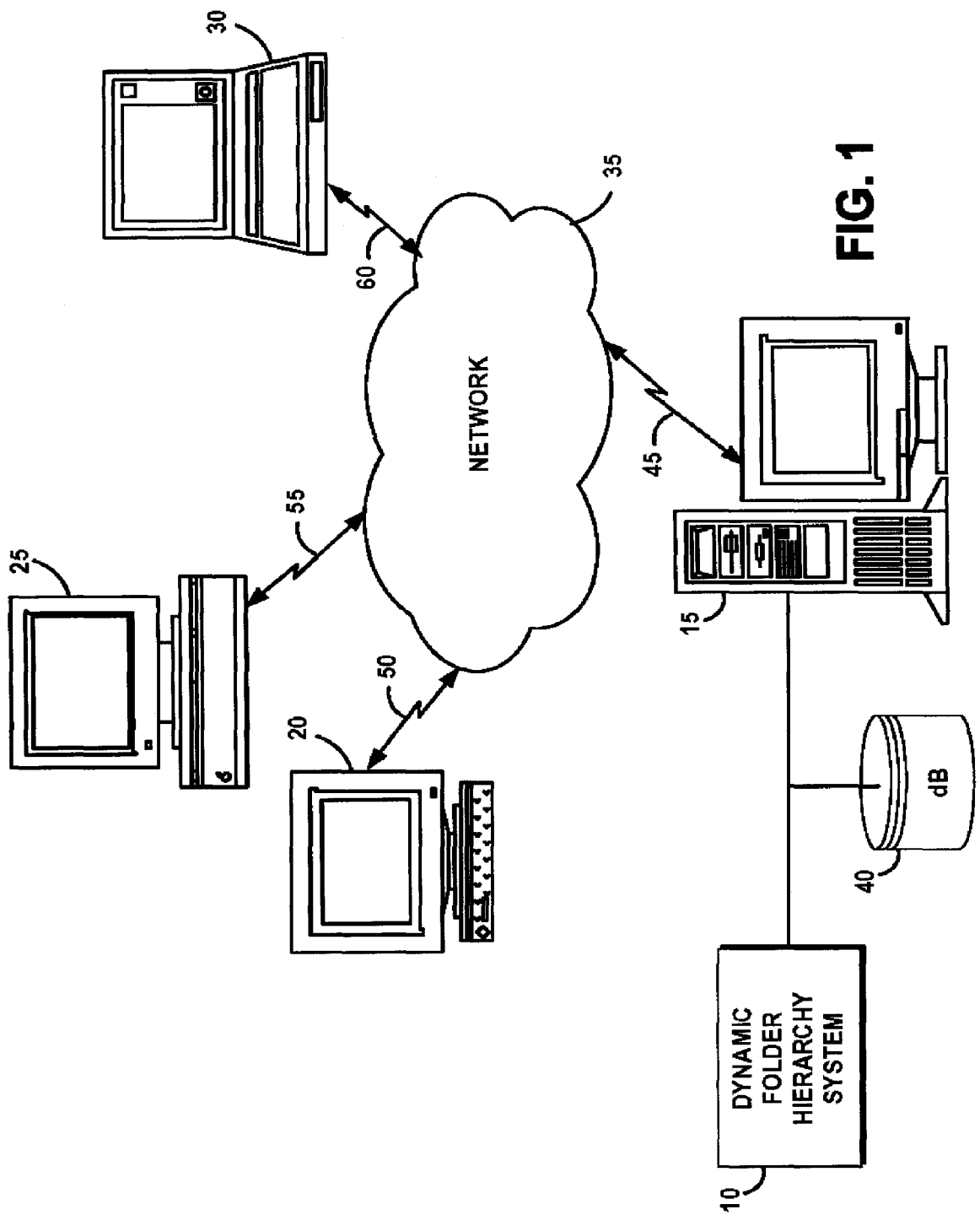
FIG. 1 is a schematic illustration of an exemplary operating environment in which a dynamic folder hierarchy system of the present invention can be used.

FIG. 1 portrays an exemplary overall environment in which a system, a service, a computer program product, and an associated method (the "system 10") for creating dynamic folder hierarchies for documents according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Users, such as remote Internet users, are represented by a variety of computers such as computers 20, 25, 30, and can access the host server 15 through a network 35. In one embodiment, system 10 creates dynamic folder hierarchies for documents, items, or object graphs stored on a data repository 40. Documents, items, or object graphs are collectively referenced herein as documents. In another embodiment, documents organized by system 10 in dynamic folder hierarchies are written in XML. Users access the documents through the dynamic folder hierarchy. In a further embodiment, users provide documents to system 10; system 10 then creates dynamic folder hierarchies for the user.

Computers 20, 25, 30 each comprise software that allows the user to interface securely with the host server 15. The host server 15 is connected to network 35 via a communications link 45 such as a telephone, cable, or satellite link. Computers 20, 25, 30, can be connected to network 35 via communications links 50, 55, 60, respectively. While system 10 is described in terms of network 35, computers 20, 25, 30 may also access system 10 locally rather than remotely. Computers 20, 25, 30 may access system 10 either manually, or automatically through the use of an application.

Figure 2:
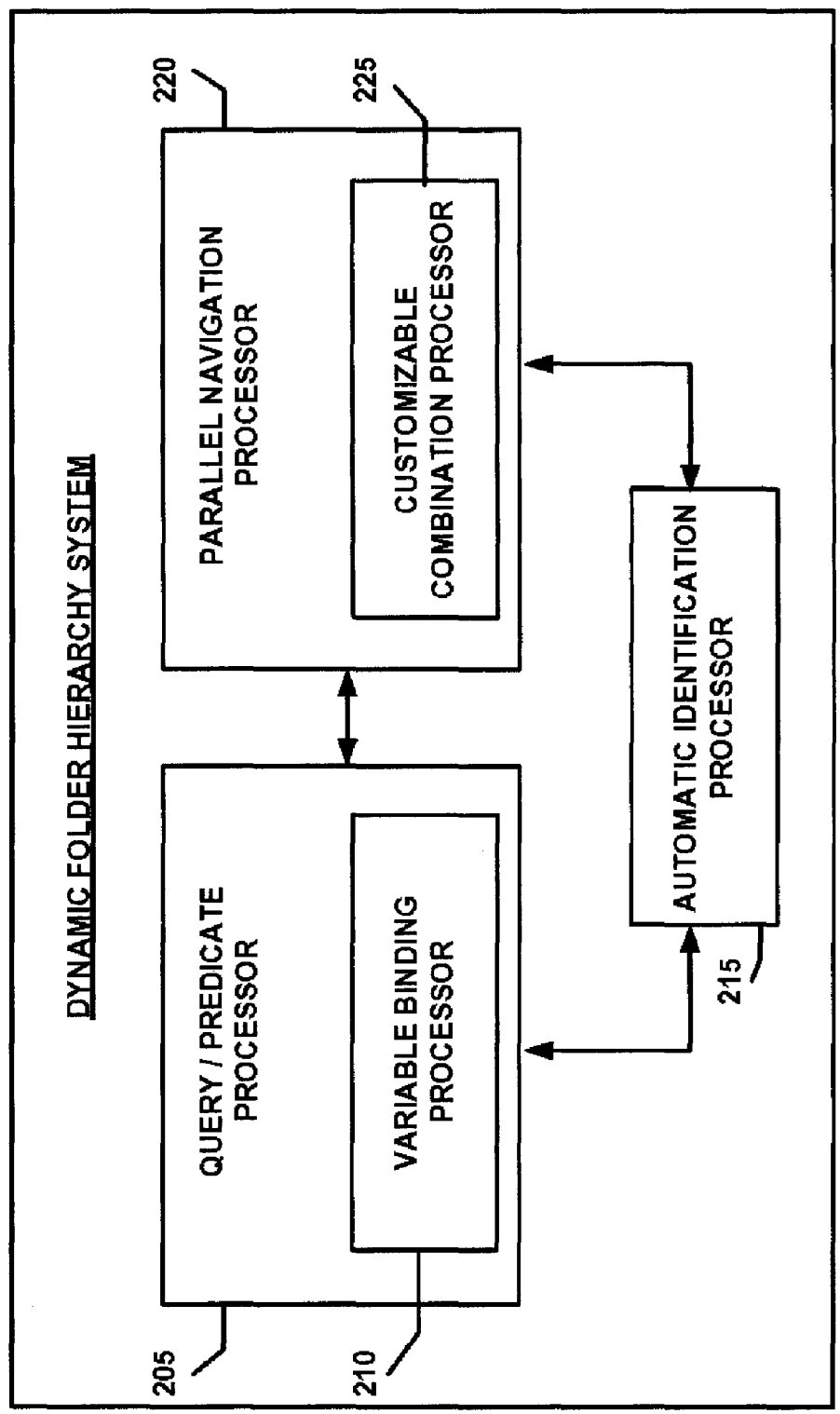
FIG. 2 is a block diagram of the high-level architecture of the dynamic folder hierarchy system of FIG. 1.

FIG. 2 illustrates a high-level architecture of system 10. System 10 comprises a query/predicate processor 205, a variable binding processor 210 which is a part of 205, an automatic identification processor 215, a parallel navigation processor 220, and a customizable combination processor 225 which is a part of 220. System 10 automatically associates a document with dynamic folder hierarchies according to predetermined criteria provided by the user.

Figure 3:
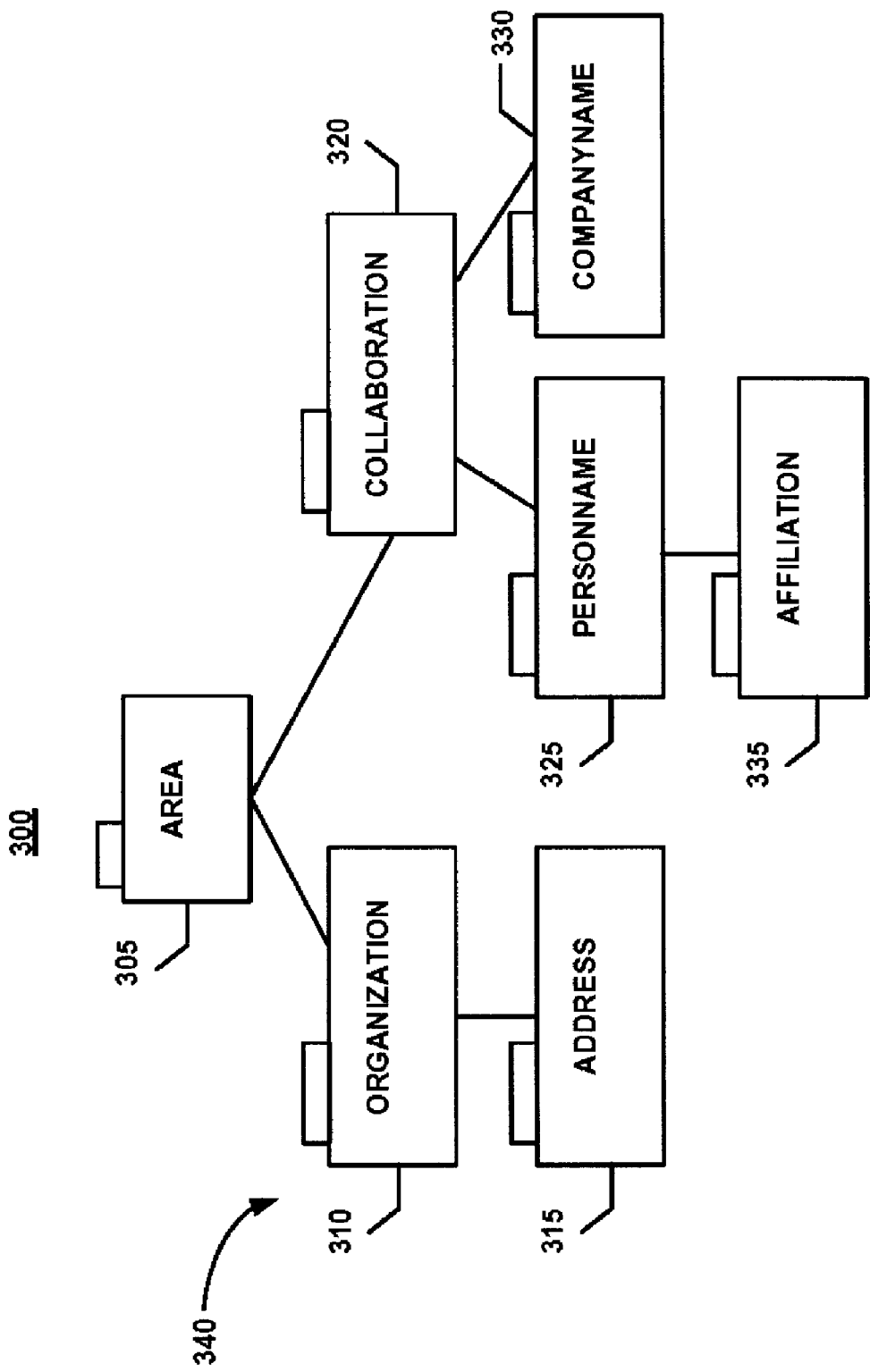
FIG. 3 is a diagram of exemplary design-time folder group definitions used by the dynamic folder hierarchy system of FIGS. 1 and 2.

FIG. 3 illustrates a design-time folder group hierarchy 300 comprising exemplary design-time folder groups. In forming a hierarchy of design-time folder groups, a user creates a design-time folder group definition. The design-time folder group definition creates a basic hierarchy from which dynamic folders are created as needed by system 10. The design-time folder group hierarchy 300 comprises the following design-time folder groups: area 305, organization 310, address 315, collaboration 320, personname 325, affiliation 330, and companyname 335, referenced collectively as design-time folder groups 340. The design-time folder groups 340 represent an organization of a collection of documents within a predetermined folder hierarchy. The design-time folder group hierarchy 300 comprises the design-time folder groups 340 and the organization of the design-time folder groups 340 into a hierarchy.

In the example of FIG. 3, system 10 generally assigns documents based on information in the document to a topic area such as, for example, computers. Area 305 comprises organization 310 and collaboration 320. Organization 310 comprises address 315, representing various addresses or locations for each organization represented by the collection of documents. Collaboration 320 comprises either individuals (represented by personname 325) or companies (represented by companyname 335). Personname 325 comprises affiliation 330.

The query/predicate processor 205 utilizes parameterized queries to define the design-time folder groups 340. For the design-time folder groups 340, exemplary parameterized queries are listed in Table 1. In one embodiment, the parameterized queries are queries which evaluate to atomic values. The number of dynamic folders in each of the design-time folder groups 340 is unknown when the design-time folder group hierarchy 300 is designed.

Table 1: Exemplary parameterized queries used by the query/predicate processor 205 to associate documents with the design-time folder groups 340.

TABLE 1

Exemplary parameterized queries used by the query/predicate processor 205 to associate documents with the design-time folder groups 340.

| Design-time Folder Group | Parameterized Query |
| --- | --- |
| area 305 | //Area/@name |
| organization 310 | //Organization/@type |
| address 315 | //Address/@city |
| collaboration 320 | //Collaboration/@unit |
| personname 325 | //Participant/Individual/@name |
| affiliation 330 | //Participant/Individual/@affiliation |
| companyname 335 | //Participant/Company/@name |

Table 2 illustrates exemplary XML documents that can be organized by system 10 into the design-time folder groups 340 using the parameterized queries of Table 1. The XML documents of table 2 comprise nested tags. The entire XML content in the documents are used by the query/predicate processor 205 to determine which documents are conceptually placed in a dynamic subfolder. Each document may appear in more than one dynamic subfolder.

TABLE 2

Exemplary XML documents organized by system 10 into a dynamic folder hierarchy.

| Document | XML structure |
|---|---|
| D1 | <Organization type="Company" name="XYZ1"><br>   <Area name="Computer"/><br>   <Address city="San Jose"/><br></Organization/> |
| D2 | <Organization type="Company" name="XYZ2"><br>   <Area name="Computer"/><br>   <Address city="Milpitas"/><br></Organization/> |
| D3 | <Organization type="non-Company" name="XYZ3"><br>   <Area name="Computer"/><br>   <Address city="San Jose"/><br></Organization/> |
| D4 | <Collaboration unit="Project" name="UVW1"><br>   <Area name="Computer"/><br>   <Participant><br>      <Company name ="XYZ1"/><br>      <Individual name="Smith" affiliation="UCLA"/><br>   </Participant><br><Collaboration> |
| D5 | <Collaboration unit="Project" name="UVW2"><br>   <Area name="Computer"/><br>   <Participant><br>      <Company name="XYZ1"/><br>      <Individual name="Smith" affiliation="ABC"/><br>      <Individual name="Jones" affiliation="ABC"/><br>   </Participant><br><Collaboration> |

Figure 4:
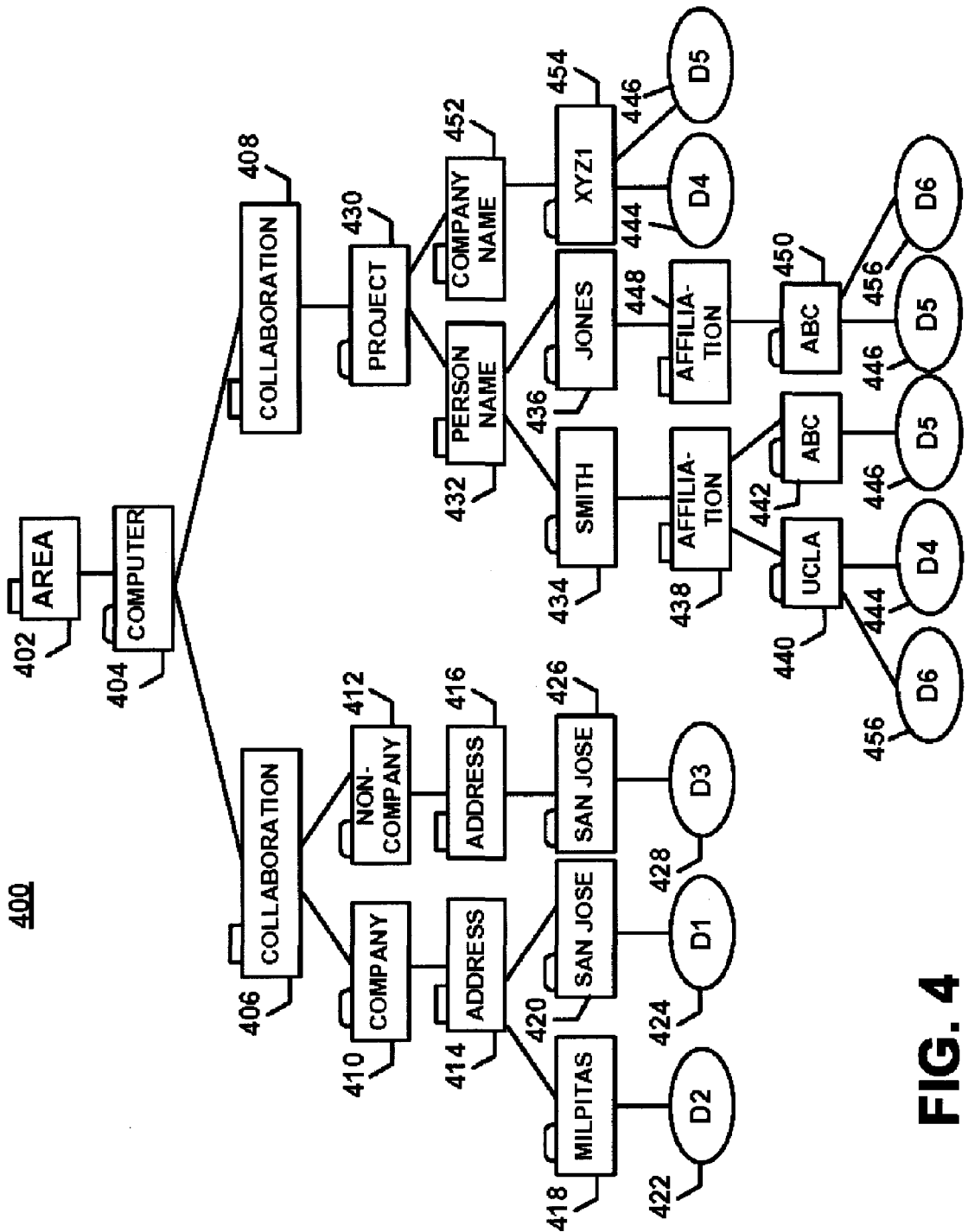
FIG. 4 is a diagram of an exemplary dynamic folder hierarchy created by the dynamic folder hierarchy system of FIGS. 1 and 2.

Given the documents of Table 2, the parameterized queries of Table 1, and the design-time folder group hierarchy 300 of FIG. 3, system 10 creates the dynamic folder hierarchy 400 shown in FIG. 4. In one embodiment, the dynamic folder hierarchy 400 is created at run-time by system 10. Each dynamic folder is specified by a pair: an associated design-time folder group definition and a distinct value of the query within its parent dynamic folder. In one embodiment, the design-time folder group definition is a query which evaluates to an atomic value or a sequence of atomic values. The pair forms a predicate that specifies the dynamic folder. Each dynamic folder is a child of the design folder group whose definition generates one or more dynamic folders.

Within area 402, system 10 creates the dynamic folder "computer" 404. System 10 creates a dynamic folder for each "area" represented by the collection of documents being organized. Additional "area" folders are created for each area represented. In the simple example illustrated by the documents of Table 2, only one "area" is represented, i.e., computer 404.

For each "area" such as computer 404, system 10 creates dynamic folders organization 406 and collaboration 408. Organization 406 corresponds to organization 315; collaboration 408 corresponds to collaboration 320. Within organization 406, system 10 creates a dynamic folder for each organization represented by the documents of Table 2: company 410 and non-company 412. System 10 organizes the organization types according to address by creating dynamic folders: address 414 for company 410 and address 416 for non-company 412.

Within address 414, system 10 creates a dynamic folder for each address found associated with a company in the collection of documents to which the design-time folder group hierarchy 300 is applied. In the exemplary list of documents in Table 2, two addresses are located for documents associated with company 410: Milpitas and San Jose. Within address 414, system 10 creates Milpitas 418 and San Jose 420. Milpitas 418 conceptually comprises document D2 422. San Jose 420 conceptually comprises document D1 424. One address is located for documents associated with non-company 412: San Jose. Within address 416, system 10 creates San Jose 426. San Jose 426 conceptually comprises document D3 428.

System 10 does not move document D2 422, document D1 424, or document D3 428 into a new location. Rather, system 10 defines a method by which an external organization through parameterized queries can find documents that meet criteria in a manner similar to locating documents organized within a folder hierarchy. As new distinct values are inserted and old distinct values are deleted, appropriate dynamic folders are conceptually created and deleted accordingly.

As represented by the documents of Table 2, all of the collaboration is by project. Consequently, system 10 creates subfolder project 430 of collaboration 408. Collaboration 408 corresponds to design-time folder group 320. Project 430 comprises personname 432. Based on the documents of Table 2, system 10 creates two subfolders for personname 432: Smith 434 and Jones 436. System 10 populates affiliation 438, with the affiliations associated with Smith 434: UCLA 440 and ABC 442. Document D4 444 conceptually resides in UCLA 440. Document D5 446 conceptually resides in ABC 442. The folder, affiliation 448, associated with Jones 436 comprises ABC 450. ABC 450 comprises the document D5 446. Personname 432 corresponds to design-time folder group personname 325. Affiliation 438 and affiliation 448 correspond to design-time folder group, affiliation 330.

System 10 determines one company name among the documents in Table 2 that may be organized under collaboration 408. System 10 then creates companyname 452 and folder XYZ1 454. Folder XYZ1 454 conceptually comprises document D4 444 and document D5 446. Companyname 452 corresponds to design-time folder group, companyname335.

Within the structure of the dynamic folder hierarchy 400, the documents of Table 1 are conceptually inserted into one or more dynamic folders. For example, document D1 424 is found in /Area/Computer/Org/Company/Address/"San Jose" and
its ancestor folders, because "//Area/@name" evaluates to
"Computer", "//Organization/@type" evaluates to "Company"
and "//Address/@city" evaluates to "San Jose". Similarly,
document D2 422 is found in /
Area/Computer/Org/Company/Address/Milpitas. Document
D3 428 is found in /
Area/Computer/Org/non-Company/Address/"San Jose".
Document D4 444 is found in two dynamic folders:
/
Area/Computer/
Collaboration/
Project/PersonName/Smith/Affiliation/UCLA,
and
/
Area/Computer/
Collaboration/Project/CompanyName/XYZ1.
Document D5 446 is found in three dynamic folders:
/
Area/Computer/
Collaboration/
Project/PersonName/Smith/Affiliation/ABC, /
Area/Computer/
Collaboration/
Project/PersonName/Jones/Affiliation/ABC,
and
/
Area/Computer/
Collaboration/Project/CompanyName/XYZ1.

To retrieve a set of documents in a dynamic folder, the query/predicate processor 205 executes a query on an associated collection of documents. The query intersects the predicate of the dynamic folder and the predicates of the ancestor dynamic folders of the dynamic folder. A query to retrieve the documents residing in San Jose 420 is formulated by the query/predicate processor 205 as:

```
collection("abc")[(//Area/@name = "Computer")
and (//Organization/@type = "Company")
and (//Address/@city = "San Jose")] This query intersects
three predicates, retrieving documents associated with
dynamic folder /
Area/Computer/Org/Company/Address/"San Jose".
A query to retrieve the documents residing in collaboration
408 is formulated as:
collection("abc")[(//Area/@name = "Computer")
and (//Collaboration/@unit = "Project")]
This query intersects two predicates. The query retrieves
the documents in dynamic folder /
Area/Computer/Collaboration/Project and its sub dynamic
folders recursively, comprising:
/PersonName/Smith,
./PersonName/Smith/Affiliation/UCLA, /
PersonName/Smith/Affiliation/ABC, ./PersonName/Jones,
and /PersonName/Jones/Affiliation/ABC,
./CompanyName/XYZ1.
The query/predicate processor 205 comprises an algorithm
for retrieving documents within a dynamic folder,
where:
retrieveDocument( ) returns a cursor of a set of documents
from a given dynamic folder,
folderNode.getQuery( ) returns a predicate of the dynamic
folder,
folderNode.getName( ) returns a label of the dynamic
folder
folderNode.getValue( ) returns an atomic value associated
with the dynamic folder, and
folderNode.getCollection( ) returns all the collections associated
with the folder hierarchy of the dynamic folder.
An exemplary pseudocode of the query/predicate processor
205 is as follows:
String retrieveQuery(in: folderNode; in: level)
beginparentNode = folderNode.getParent( )
if (parentNode == null)
begin
// Current location is root folder. Retrieve the associated
collections.
// System 10 assumes there is a minimum of one collection.
collections = folderNode.getCollection( )
// Union all the collections, i.e. (collection("A")
|collection("B") | ....)
predicate = "("
for each col in collections
predicate = predicate + " collection(" + col.getName( ) + ")"
if col is not the last onepredicate = predicate + "|"
predicate = predicate + ")["
end
// Get all the ancestor predicatesancestorPredicate =
retrieveQuery(parentNode, level+1);predicate = ancestor-
Predicate + "(" + folderNode.getQuery( ) + " = "
+folderNode.getValue( ) + ") ";
if ( level == 0 )
predicate.append("]");
else
predicate.append(" and ");
return predicate;
end
ResultSet retrieveDocument(in: folderNode)
begin
query = new Statement(retrieveQuery(folderNode, 0));
return query.execute( );
end
```

In one embodiment, system 10 creates materialized query tables to pre-compute results for dynamic folders that are frequently accessed. Creating materialized query tables accelerates query execution by rewriting the query using the pre-computed result. In another embodiment, system 10 caches some of the results from an immediate folder during the navigation to use for further navigating the content of any descendent folders. In yet another embodiment, various indexes can be used or different query engines can be employed. In a further embodiment, system 10 incorporates constraints into the design-time folder group definitions:

Year: //Conference[./@year>2000]/@year

The variable binding processor 210 utilizes a variable binding in the design-time folder group definitions in a hierarchy of design-time folder groups. Variable binding assigns a variable to a particular query. Variable binding provides a mechanism for relating values when defining a design-time folder group hierarchy. Relationships between values are reflected when folders are dynamically created by system 10.

Using variable binding, the design-time folder group definitions for personname 335 and affiliation 330 become:

PersonName: for $v:=//Participant/Individual, $v/@name
Affiliation: $v/@affiliation, where $v is the variable defined by the user. The design-time folder group definitions for personname 335 and affiliation 330 are selected for variable binding because a relationship exists between personname 335 and affiliation 330, as represented by the documents of Table 2. The design-time folder group definitions for personname 335 and affiliation 330 comprise $v to refer to the same individual.

The remaining design-time folder group definitions have the same definitions as previously described. Using variable binding, the semantics for /PersonName/Smith/Affiliation/UCLA, /PersonName/Smith/Affiliation/ABC and /PersonName/Jones/Affiliation/ABC. in /Area/Computer/Collaboration/Project are different from the ones previously described. The dynamic folder /PersonName/Smith/Affiliation/UCLA classifies the projects Smith participated in while being affiliated with UCLA. The dynamic folder /PersonName/Smith/Affiliation/ABC classifies the projects Smith participated in while being affiliated with ABC.

The following document, D6, demonstrates the usefulness of variable binding:

```
<Collaboration unit="Project"name="UVW3">
<Area name="Computer"/>
<Participant>
<Individual name="Smith"affiliation="UCLA"/>
<Individual name="Jones"affiliation="ABC"/>
</Participant>
<Collaboration>
```

System 10 uses variable binding to reflect a relationship between individuals and their affiliation. Document D6 represents two individuals with different affiliations participate in a project collaboration: Smith at UCLA and Jones at ABC. Without variable binding, document D6 appears in UCLA 440, ABC 442, ABC 450, and a UCLA folder under affiliation 448 because the terms UCLA, Smith, Jones, and ABC all appear in D6:

```
/
Area/Computer/
Collaboration/
Project/PersonName/Smith/Affiliation/UCLA, /
Area/Computer/
Collaboration/
Project/PersonName/Smith/Affiliation/ABC, /
Area/Computer/
```

```
    Collaboration/
    Project/PersonName/Jones/Affiliation/UCLA,
    and
    /
    Area/Computer/
    Collaboration/
    Project/PersonName/Jones/Affiliation/ABC.
```

Through variable binding, the variable binding processor 210 recognizes the relationship between individual name and affiliation and places D6 only in UCLA 440 and ABC 450, as illustrated by D6 456 in FIG. 4:

```
    /
    Area/Computer/
    Collaboration/
    Project/PersonName/Smith/Affiliation/UCLA, and
    /
    Area/Computer/
    Collaboration/
    Project/PersonName/Jones/Affiliation/ABC
    A further example of a query using the variable binding
    processor 210 is: collection("abc")[(//Area/@name =
    "Computer")
    and (//Collaboration/@unit = "Project")
    and (for $v := //Participant/Individual
    return ($v/@name = "Smith"
    and $v/@affiliation = "ABC"))] .
```

This query intersects four predicates, retrieving the documents in the following dynamic folder:

```
    /
    Area/Computer/Collaboration/
    Project/PersonName/Smith/Affiliation/ABC.
    if there are sub dynamic folders in the dynamic folder/
    Area/Computer/Collaboration/Project/
    PersonName/Smith/Affiliation/ABCwith additional
    variable bindings, the query generated by system
    10 will be properly nested XQuery
    For-Let-Where-Orderby-Return (FLWOR) expressions. These
    FLWOR expressions reflect the correct scopes of the variables.
```

The variable binding processor 210 utilizes an enhanced retrieveQuery( ) method to manage variable binding. The retrieveDocument method is as previously described. The term "folderNode.getBinding( )" returns the binding statement and "null" in the absence of binding.

```
    String retrieveQuery(in: folderNode; in: level, out: nesting)
    begin
    parentNode = folderNode.getParent( )
    if (parentNode == null)
    begin collections = folderNode.getCollection( )
    predicate = "("for each col in collections
    predicate = predicate + " collection(" + col.getName( ) + ")"
    if col is not the last one
    predicate = predicate + "|"
    predicate = predicate + ")["
    end
    // Get all the ancestor predicatesancestorPredicate =
    retrieveQuery(parentNode, level+1);
    if ( folderNode.getBinding( ) != null )
    // Add the "for ... return ..." clause
    predicate =
    ancestorPredicate + "(" + folderNode.getBinding( ) + " return
    ((" +folderNode.getQuery( ) + " = " +
    folderNode.getValue( ) + ") ";nesting++;
    elsepredicate =
    ancestorPredicate + "(" + folderNode.getQuery( ) + " = "
    +folderNode.getValue( ) + ") ";
    // Fix the matching brackets
    if ( level == 0 )
    for (i := 0 to nesting)predicate.append("))")
    predicate.append("]")
    elsepredicate.append(" and ")
    return predicate;
    end
```

External variable definitions in query languages allow values to be provided by the external environment. Consequently, the atomic-valued queries of the design-time folder group definitions can be parameterized queries. The values of the variables are added to the evaluation context before the derived query is evaluated and documents in the dynamic folders be retrieved. For example:

define variable $x as xs:integer external

Year: //Conference[./@year>$x]/@year

The algorithm to derive the query for retrieving the documents in a dynamic folder remains the same as previously described except that the variable definitions are added to the prolog of the query.

System 10 views the design-time folder hierarchy definition as a tree with the design-time folder group definitions as nodes. Given a design-time folder group node N, N.getName( ) returns the name of the folder group definition, and N.getQuery( ) returns the atomic-valued query of the folder group definition. The automatic identification processor 215 utilizes the following algorithm to determine dynamic folders given a design-time folder hierarchy definition and a document:

```
    "ExecuteQuery"executes a query on an XML document.
    PreorderProcess(in: xml_doc, in: Nr, in: parent_path, in-
    out: path_list)
    begin
    if (Nr is null)return false;
    atomic_value = ExecuteQuery(xml_doc, Nr.getQuery( ));
    if (atomic_value is null)return false;
    this_path = parent_path + "/"+ Nr.getName( ) + "/"+
    atomic_value;
    flag = false;
    for (each child node Nc of Nr)if (PreorderProcess(xml_doc,
    Nc, this_path, path_list) is true)flag = true;
    if (flag is false)path_list.append(thispath);
    return true;
    end
```

When "PreorderProcess" is executed with a given document, the root group definition of the hierarchy, an empty parent path, and an empty path list, the result path list returns the dynamic folders in which the given document can be found. As in the examples, the document can also be found in the ancestor dynamic folders of the dynamic folders listed. To avoid redundancy, the ancestor dynamic folders are not included in the list. System 10 examines a definition with respect to the algorithm. If a dynamic folder satisfies a certain definition, system 10 checks the children of the dynamic folder to see if the children satisfy the definition. If not, system 10 stops following that path because none of the descendants will satisfy the definition.

External variable definitions are bound before the execution of "PreorderProcess". In conjunction with variable definitions and variable bindings, system 10 utilizes an additional parameter "var_pairs". The parameter "var_pairs" is a list of name-value pairs for the variables. "PreorderProcess" passes the parameter "var_pairs" to its recursive calls and to "ExecuteQuery". "ExecuteQuery" uses the parameter "var_pairs" to modify the query and appends the parameter "var_pairs" to the pair list if variable bindings are defined for the current node.

An example of the use of the parameter "var_pairs" is applied to affiliation 330. System 10 assumes var_paris={(v, "<Individual name="Smith"affiliation="ABC"/>")}. Consequently, the query becomes:
define variable $v {<Individual name="Smith"affiliation="ABC"/>}$v/@Affiliation In the algorithm described above, system 10 executes the queries of the design-time folder group definitions individually. A similar algorithm can compose one large query such that the execution of that single query can generate the result path list.

In one embodiment, system 10 limits the query of each design-time folder group definition to return only one distinct atomic value. In this case, the hierarchy of the design-time folder groups is fixed; i.e., the hierarchy of the dynamic folders at run-time is the same as that in the definition time. This embodiment is useful for situations when users primarily desire a particular dimension for categorizing the documents. Examples of design-time folder group definitions in this embodiment are:

```
Computer: //Area[@name = "Computer"]/@name
Company: //Organization[@type = "Company"]/@type
Project: //Collaboration[@unit = "Project"]/@unitSanJose:
//Address[@city = "
San Jose"]/@city
Smith: //Participant/Individual[@name = "Smith"]/@name
XYZ1: //Participant/Company[@name = "XYZ1"]/@name
UCLA: //Participant/Individual[@affiliation
="UCLA"]/@affiliation
or
Computer: for $v := //Area/@name = "Computer"return
(if($v) then "Computer"else ( ))
Company: for $v := //Organization/@type =
"Company"return (if($v) then "Company"else ( ))
Project: for $v := //Collaboration/@unit = "Project"return
(if($v) then "Project"else ( ))
SanJose: for $v := //Address/@city = "San Jose"return
(if($v) then "San Jose"else ( ))etc.
```

The parallel navigation processor 220 allows parallel navigation to documents along additional paths in a dynamic folder hierarchy. Using parallel navigation, a user can navigate along different paths in the dynamic folder hierarchy in different orders to view categorization of documents. The parallel navigation processor 220 in conjunction with the customizable combination processor 225 allows a user to define set operations on the results of additional paths. These set operations comprise a combination of intersections, unions, and differences.

With the dynamic folder hierarchy of FIG. 4 as an example, a user navigates to collaboration 408. The user then navigates along two paths: PersonName 432 to Smith 434 and CompanyName 452 to XYZ1 454. Following a path from PersonName 432 to Smith 434; the user retrieves documents in the documents/Collaboration/Project/PersonName/Smith folder. Following a path from CompanyName 452 to XYZ1 454, the user retrieves documents in the /Collaboration/Project/CompanyName/XYZ1 folder.

In the example, the user is interested in projects in which an individual named Smith and a company named XYZ1 participated. The user defines the overall result as the intersection of results from the paths to the individual named Smith and the company named XYZ1. When the user navigates to Affiliation 438 then ABC 442, the overall result is the intersection of documents in /Collaboration/Project/PersonName/Smith/Affiliation/ABC and XYZ1 454.

In one embodiment, system 10 obtains the results of all the paths and then applies the defined set operations to combine the results into the overall result. The results of all the paths may be obtained from Automatic Summary Tables (ASTs). In another embodiment, system 10 examines the definitions of all the paths and combines and rewrites the query or queries. Consequently, system 10 avoids unnecessary computation and efficiently executes the query or queries.

The examples and the algorithms previously discussed have assumed one collection of documents associated with a dynamic folder hierarchy. In one embodiment, system 10 may provide a dynamic folder hierarchy for additional collections of documents. In this embodiment, system 10 generates additional dynamic folder hierarchies, each of which associates with a set of collections. Some overlap may occur between the dynamic folder hierarchies. In a further embodiment, system 10 allows the top level predicates of a dynamic folder hierarchy on document collections to determine which document collections are associated with each top level sub-tree. In this embodiment, a single dynamic folder hierarchy is sufficient.

In the examples presented, the data organized by system 10 into dynamic folder hierarchies are XML documents. The data can be easily generalized to items or object graphs because the variable binding and the variable definition mechanisms can be readily applied to such data.

Figure 5:
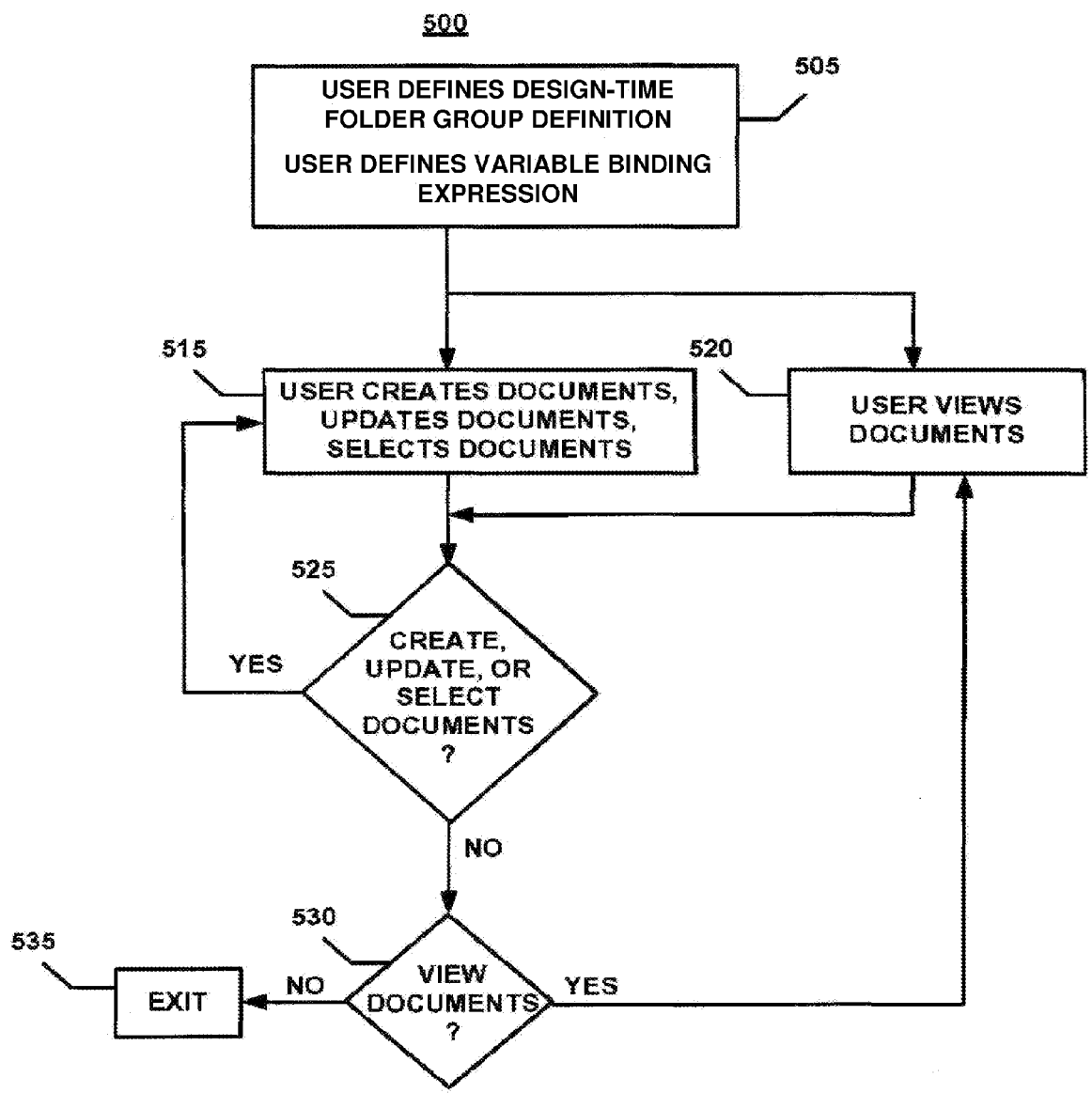
FIG. 5 is a process flow chart illustrating a method by which a user operates the dynamic folder hierarchy system of FIGS. 1 and 2.

FIG. 5 illustrates a method 500 followed by a user to view or retrieve documents. At step 505, the user defines a design-time folder group definition. The design-time folder group definition creates a basic hierarchy from which dynamic folders are created as needed by system 10. The user defines variable binding expressions for the dynamic folder hierarchy at step 505 as part of the design-time folder group definitions. At step 515, the user creates documents, updates documents, or otherwise selects documents for which system 10 creates a dynamic folder hierarchy. Updating a document also comprises deleting a document. At step 520, the user views documents using system 10. The user may view documents singly or in parallel. Further, the user may select a specific document and view the folders with which the document is associated.

At decision step 525, the user may choose to return to step 515 to create, update, or select documents. If at decision step 525 the user does not choose to create, update, or select documents, the user may choose to view additional documents at decision step 530. The user may view documents at step 520 without changing the design-time folder group definitions to accommodate the changed document set; system 10 automatically and dynamically modifies the folder hierarchy to reflect any changes in specific documents or the collection of documents for which system 10 is providing a dynamic folder hierarchy. If the user does not wish to view additional documents at decision step 530, the user may exit the dynamic folder hierarchy at step 535.

Figure 6:
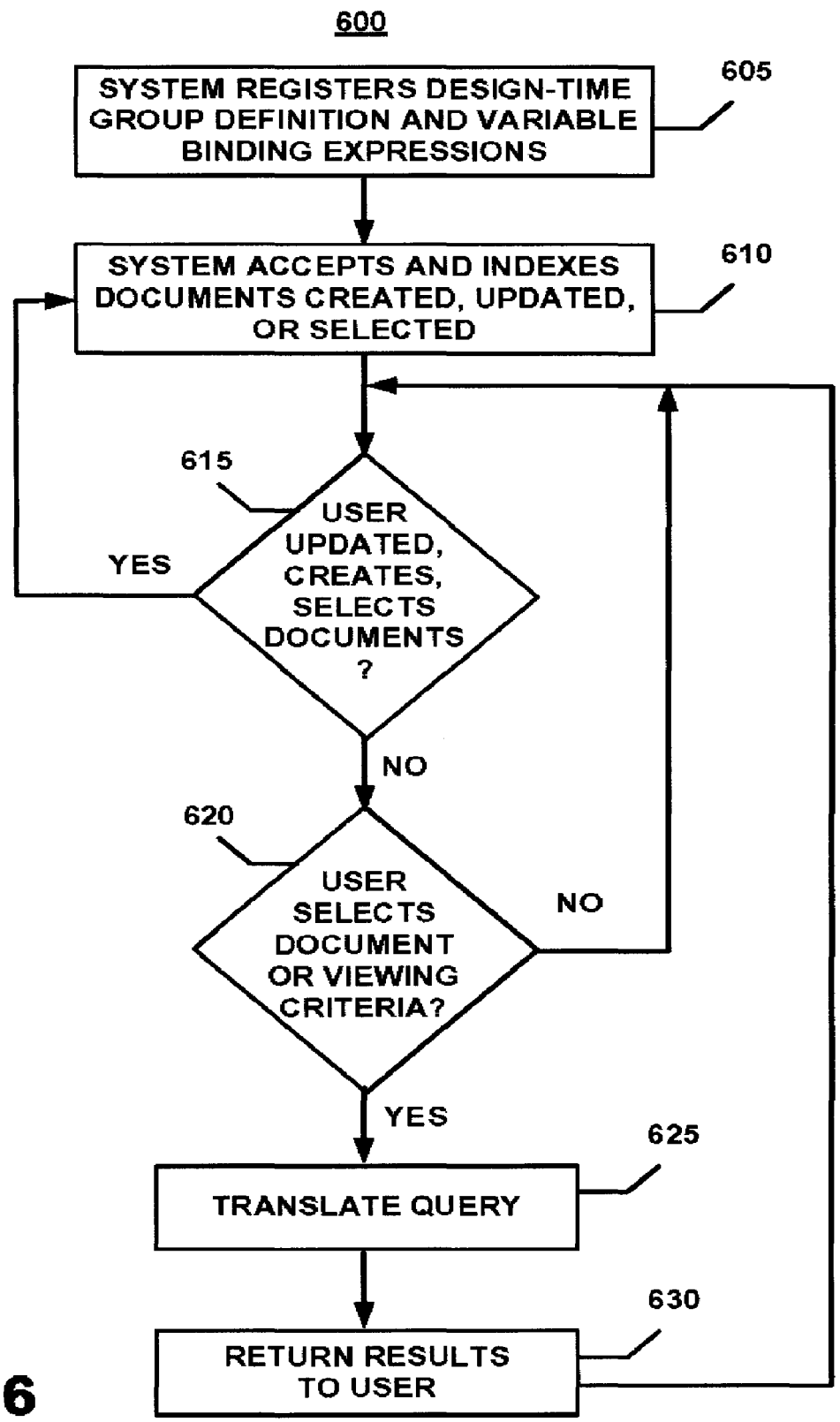
FIG. 6 is a process flow chart illustrating a method of operation of the dynamic folder hierarchy system of FIGS. 1 and 2.

FIG. 6 illustrates a method 600 for creating dynamic folders from the design-time folder group definition for a collection of documents. At step 605, system 10 registers the design-time folder group definitions provided by the user and the variable binding expressions provided by the user in step 505. At step 610, system 10 accepts and indexes documents created, updated, or selected by the user in step 515. System 10 accepts the documents, indexes them, and stores them in a form in which the content can be interpreted by system 10. At decision step 615, the user chooses to update, create, or select additional documents, returning to step 610. Otherwise, processing proceeds to decision step 620.

At decision step 620, the user chooses to select a document to view or select other viewing criteria. At step 625 system 10 translates the query representing the selection of document or viewing criteria of decision step 620. System 10 returns a result of the query to the user at step 630. Processing then returns to step 615 for additional action by the user. If the user does not select a document or viewing criteria at decision step 620, processing returns to step 615 for additional action by the user.

Steps 625 and 630 comprise a viewing stage of system 10. A user may find and view a document or set of documents inside a specified folder, find or view the folders in which a specified document is located, or perform parallel navigation. Parallel navigation allows the user to view more than one dynamic folders at a time and to combine viewing criteria or queries such as unions, intersections, etc.

It is to be understood that the specific embodiments of the invention that have been described are merely illustrative of certain applications of the principle of the present invention. Numerous modifications may be made to the system and method for creating dynamic folder hierarchies described herein without departing from the spirit and scope of the present invention. Moreover, while the present invention is described for illustration purpose only in relation to the WWW, it should be clear that the invention is applicable as well to, for example, data stored on an intranet, a local area network, locally, or any other location accessible by the present invention. Furthermore, while the present invention is described for illustration purpose only in relation to XML documents, it should be clear that the invention is applicable as well to, for example, any form of structured, semi-structured, or non-structured data.

What is claimed is:

1. A system for creating a dynamic folder hierarchy, comprising:
   a network;
   a host server connected to said network via a communications link; and
   a computer in communication with said network wherein said computer including a processor capable of executing instructions comprising:
      creating a design-time folder group definition specifying an organization of a hierarchy of design-time folder groups with each design-time folder group consisting of a plurality of design-time folders arranged in parent-child relationships, said definition including a set of variable binding expressions for associating a plurality of documents with a plurality of dynamic folders;
      generating a query with predicates from said set of variable binding expressions;
      searching a collection of documents to identify documents which match said query, each of said documents in said collection of documents containing self-describing data;
      dynamically creating a hierarchy of dynamic folders including child dynamic folders within said hierarchy of design-time folder groups by using a combination of said design-time folder groups definition and said identified documents; and
      associating each of said identified documents with at least one dynamic folder in said hierarchy of dynamic folders.

2. The system of claim 1, wherein said document containing self-describing data comprises any one of an XML document, an object graph, or metadata.

3. The system of claim 1, further comprising generating additional dynamic folder hierarchies, each of which associates a collection of documents wherein overlapping occurs between said dynamic folder hierarchies.

4. The system of claim 1, wherein said document containing self-describing data format comprises descriptive data used to dynamically organize documents within said dynamic folder hierarchy.

5. The system of claim 1, further comprising a user retrieving at least one document from said hierarchy of dynamic folders by executing a query which intersects a predicate of one dynamic folder and at least one of the predicates of a parent folder of said dynamic folder.

6. The system of claim 1, further comprising incorporating external parameter bindings into said design-time folder group definitions.

7. The system of claim 1, further comprising retrieving a set of documents matching a user defined query wherein said retrieval follows a conventional foldering path.

8. The system of claim 1, further comprising a user navigating along additional paths in said hierarchy of dynamic folders and combining navigation results using set operations.

9. The system of claim 1, further comprising creating materialized query tables to pre-compute search results for dynamic folders that are frequently accessed by a user.

10. The system of claim 1, further comprising automatically identifying which dynamic folders contain a particular document based on semantics of an object.

11. A computer program product for creating a dynamic folder hierarchy, said computer program product comprising:
   a computer readable medium readable by a processing circuit and storing instructions for execution by said processing circuit for performing a method comprising:
      creating a design-time folder group definition specifying an organization of a hierarchy of design-time folder groups with each design-time folder group consisting of a plurality of design-time folders arranged in parent-child relationships, said definition including a set of variable binding expressions for associating a plurality of documents with a plurality of dynamic folders;
      generating a query with predicates from said set of variable binding expressions;
      searching a collection of documents to identify documents which match said query, each of said documents in said collection of documents containing self-describing data;
      dynamically creating a hierarchy of dynamic folders including child dynamic folders within said hierarchy of design-time folder groups by using a combination of said design-time folder groups definition and said identified documents; and
      associating each of said identified documents with at least one dynamic folder in said hierarchy of dynamic folders.

12. The computer program product of claim 11, further comprising automatically identifying which dynamic folders contain a particular document based on semantics of an object.

13. The computer program product of claim 11, wherein said document containing self-describing data comprises any one of an XML document, an object graph, or metadata.

14. The computer program product of claim 11, further comprising generating additional dynamic folder hierarchies, each of which associates a collection of documents wherein overlapping occurs between said dynamic folder hierarchies.

15. The computer program product of claim 11, further comprising a user retrieving at least one document from said hierarchy of dynamic folders by executing a query which intersects a predicate of one dynamic folder and at least one predicate of a parent folder of said one dynamic folder.

16. The computer program product of claim 11, further comprising incorporating external parameter bindings into said design-time folder group definitions.

17. The computer program product of claim 8, wherein said document containing self-describing data format comprises descriptive data used to dynamically organize documents within said dynamic folder hierarchy.

18. The computer program product of claim 11, further comprising retrieving a set of documents matching a user defined query wherein said retrieval follows a conventional foldering path.

19. The computer program product of claim 11, further comprising creating materialized query tables to pre-compute search results for dynamic folders that are frequently accessed by a user.

* * * * *